(12) United States Patent
Lagier

(10) Patent No.: US 8,827,363 B2
(45) Date of Patent: Sep. 9, 2014

(54) CHAIRLIFT SEAT HAVING A BICYCLE TRANSPORT DEVICE

(75) Inventor: Yves Lagier, Argonay (FR)

(73) Assignee: Sommital (FR)

( * ) Notice: Subject to any disclaimer, the term of this patent is extended or adjusted under 35 U.S.C. 154(b) by 0 days.

(21) Appl. No.: 13/636,450

(22) PCT Filed: Feb. 16, 2011

(86) PCT No.: PCT/IB2011/050636
§ 371 (c)(1),
(2), (4) Date: Nov. 20, 2012

(87) PCT Pub. No.: WO2011/101785
PCT Pub. Date: Aug. 25, 2011

(65) Prior Publication Data
US 2013/0057034 A1 Mar. 7, 2013

(30) Foreign Application Priority Data
Feb. 19, 2010 (FR) ...................................... 10/51232

(51) Int. Cl.
*A47C 7/62* (2006.01)
*B61B 12/00* (2006.01)
*B60R 9/10* (2006.01)

(52) U.S. Cl.
CPC ................. *B60R 9/10* (2013.01); *B61B 12/002* (2013.01)
USPC ........................ 297/217.1; 211/17; 105/149.2

(58) Field of Classification Search
USPC ......... 211/17–24; 105/149.1, 149.2; 224/924; 297/217.1, 244; 280/809, 296, 288.4, 280/292, 301
See application file for complete search history.

(56) References Cited

U.S. PATENT DOCUMENTS

| | | | |
|---|---|---|---|
| 590,773 A | 9/1897 | Pruden | |
| 615,264 A | 12/1898 | Du Pont | |
| 650,663 A * | 5/1900 | Whitcher | ........................ 211/21 |
| 4,171,077 A | 10/1979 | Richard, Jr. | |
| 5,098,155 A * | 3/1992 | Graber | ........................ 297/217.1 |
| 5,246,120 A * | 9/1993 | Walker | ............................ 211/19 |

(Continued)

FOREIGN PATENT DOCUMENTS

| | | |
|---|---|---|
| CA | 2423721 A1 | 9/2004 |
| EP | 1466819 A1 | 10/2004 |

(Continued)

OTHER PUBLICATIONS

International Search Report issued Jun. 8, 2011 re: PCT/IB2011/050636, pp. 4; citing: EP 1 849 655 A1, CA 2 423 721 A1, EP 1 466 819 A1 and U.S. Patent No. 4,171,077 A.

*Primary Examiner* — Korie H Chan
(74) *Attorney, Agent, or Firm* — Cantor Colburn LLP

(57) ABSTRACT

The invention relates to a chairlift seat (3), the width thereof extending in a transverse direction (I-I). The seat (3) is to be moved in a longitudinal direction (II-II) and comprises a bicycle (2) transport device (1) secured thereto. The transport device (1) includes supporting means (6) extending in a first direction (III-III) substantially parallel to the transverse direction (I-I) of the seat (3). At least one receiving and holding device (8), carried by the supporting means (6), is shaped such as to receive and hold at least one first wheel (2a) of a bicycle (2) oriented in a plane (P) substantially perpendicular to the first direction (III-III). The transport device (1) is arranged behind the seat (3).

12 Claims, 8 Drawing Sheets

(56) References Cited

U.S. PATENT DOCUMENTS 5,702,007 A    12/1997   Fritz et al.
5,749,474 A *   5/1998   Woodcock ...................... 211/18
7,959,047 B2 *   6/2011   Hammond .................... 224/521

FOREIGN PATENT DOCUMENTS

| EP | 1849655 A1 | 10/2007 | |
| FR | 2958255 A1 * | 10/2011 | ............... B62H 3/04 |
| WO | 2009121817 A1 | 10/2009 | |

* cited by examiner

CHAIRLIFT SEAT HAVING A BICYCLE TRANSPORT DEVICE

TECHNICAL FIELD

The present invention relates to a chairlift seat comprising a bicycle transport device, the width of the seat extending in a transverse direction and being intended to be moved along a longitudinal direction.

BRIEF DESCRIPTION OF RELATED ART

A first known chairlift seat includes means for suspending the frame of a bicycle extending at the rear and away from the chairlift seat. During its transport, the bicycle is hung with its wheels substantially at the same height, the frame of the bicycle being oriented in length along the transverse direction of the seat.

Such a seat has the drawback of forcing the person responsible for the loading to lift up the totality of the weight of the bicycle in order to install it on the suspension means, both during the step for approaching the seat with the bicycle and during the step for hooking it up. The result of this is significant effort of the persons responsible for loading and unloading when the latter have to carry out operations throughout the day in a repetitive and frequent way, as this is the case during use with a ski lift.

And the relative orientation which has to be given to the bicycle relatively to the seat in order to store it on the suspension means complicates and makes the loading and unloading operations very tedious.

Finally, it is only generally possible to install one bicycle per chairlift seat, which does not allow a large number of bicycles to be transported by the lift per unit time (low throughput per hour).

Chairlift seats with a device for transporting a bicycle are described in documents EP 1 849 655, EP 1 466 819 and WO 2009/121817.

In these documents, the bicycle transport device is attached on the outer side of the chairlift seat and necessarily juts out on either side of the seat along the longitudinal displacement direction of the seat.

Such a seat again only allows the transport of one bicycle at a time, and therefore does not allow a high throughput of transported bicycles by the chairlift. Further, the position of the transport device on the outer side of the seat and the jutting out in length beyond the seat along the longitudinal direction, notably towards the front, are a nuisance for the users when they seek to access the seat or escape therefrom by a lateral movement.

BRIEF SUMMARY

A first problem proposed by the invention is to design a chairlift seat with a bicycle transport device which is simple and rapid to attach onto the chairlift seat, without having to disassemble or modify the elements of the seat.

Simultaneously, the invention aims at designing a chairlift seat with a bicycle transport device which facilitates the loading and unloading operations and which allows boarding of passengers and transport of the latter safely.

In order to attain these goals as well as other ones, the invention proposes a chairlift seat extending in width along a transverse direction and intended to be displaced along a longitudinal direction, including a bicycle transport device comprising:

elongated supporting means along a first direction substantially parallel to the transverse direction of the seat,
at least one receiving and holding device, borne by the supporting means, shaped so as to receive and hold at least one first bicycle wheel oriented in a plane substantially perpendicular to the first direction, wherein the transport device is positioned behind the seat.

The transport device will thus be installed behind the seating position and the back of the seat, and only requires little, or no disassembling and/or modification of the seat. Disassembling and adaptation operations of the seat are thereby avoided.

As the transport device is positioned behind the seat, the passengers may access the seat or leave the seat safely during boarding or unboarding.

Because said at least one receiving and holding device orientates said at least first bicycle wheel in a plane substantially perpendicular to the first direction, it is possible to put away and put in order several bicycles along the width of the chairlift seat, the bicycles occupying less volume in this orientation. The result of this is that the throughput of the chairlift is strongly increased. For example we succeeded in easily transporting at least three bicycles per seat for four persons, which is three times greater than the authorized throughput by the transport devices previously known.

Finally because said first bicycle wheel is received and held by the receiving and holding device with an orientation of this wheel in a plane substantially perpendicular to the first direction, the person responsible for the loading may carry out the step for approaching the rear of the seat by wheeling the bicycle on the ground until the first wheel is engaged into the receiving and holding device.

Preferably, provision may be made for having the supporting means include a single rod. The removable attachment of the receiving and holding devices on a single rod of the supporting means gives the possibility of easily adapting the number of receiving and holding devices on a same rod, and also gives the possibility of adjusting their distances relatively to each other along the length of the rod.

Advantageously, it may be provided that:
the single rod has a non-circular cross-section,
said at least one receiving and holding device is added and attached removably on the single rod via attachment means cooperating by shape-mating with the cross-section of the rod.

Cooperation by mating shapes between the cross-section of the rod and the attachment means allows the taking up of the pivoting torque induced in the receiving and holding device by the presence of the bicycle. As this pivoting torque is entirely taken up and compensated by this mating of shapes, the supporting means may merely be limited to only including a single rod with a non-circular cross-section extending substantially parallel to the transverse direction of the seat. The bicycle transport device thus includes a reduced number of elements to be assembled on the seat without however reducing its reliability.

In terms of vocabulary, the term of <<rod>> is meant to designate a slender object with any (solid, hollow, circular or square cross-section for example) cross-section.

Preferably, provision may be made so that:
the seat includes a bearing structure with lateral uprights,
securing means are positioned at the ends of the supporting means,
the securing means are shaped so as to be attached to the lateral uprights of the bearing structure.

The securing means give the possibility of attaching in a simple and very rapid way the supporting means to the chairlift seat. Further, as the securing means only need to be attached to the lateral uprights of the bearing structure of the chairlift seat, and the bearing structures of the chairlift seats almost always include lateral uprights, the transport device is thus compatible with the quasi-totality of the chairlift seats existing today.

Advantageously it may be provided that each receiving and holding device is shaped for only receiving and only holding a single first bicycle wheel.

Advantageously, this single first bicycle wheel is the front wheel of the bicycle.

After engagement and holding of the first bicycle wheel (preferably the front wheel) in the receiving and holding device, the remainder of the bicycle will thus pivot around its first wheel in order to be oriented along a substantially vertical direction with its second wheel below.

The center of the gravity of the bicycle is thus brought as close as possible to the center of gravity of the seat along the longitudinal direction. With this, it is thereby possible for the seat in spite of the presence of one or several bicycles, to retain a suitable seating angle for transporting persons. Indeed, if the presence of the bicycle would induce a too large disequilibrium of the seat, leading to a seating angle non-compliant with regulations and standards in effect, any chairlift seat bearing one or several bicycles would not be able to be simultaneously used for transporting users, which would have the consequence of very strongly limiting the number of transported passengers by the chairlift and therefore indirectly the bicycle throughput. This is most particularly significant when a single seat transports more than one bicycle.

Finally, holding a single first bicycle wheel by the receiving and holding device gives the possibility, after the step for approaching from the rear of the seat by wheeling the bicycle on both of its wheels, of only having to lift a fraction of the weight of the bicycle during a final approach step. Finally, the user has only possibly to lift the totality of the weight of the bicycle only for a very short step for hooking it up in order to engage the single first wheel into the receiving and holding device. However provision may be made for placing the receiving and holding device at a height such that, during the hooking-up step, the second wheel of the bicycle may remain on the ground so as not to force the user to lift the totality of the weight of the bicycle.

Preferably, it may be provided that the bicycle transport device includes lateral blocking means in order to block along the first direction the second wheel of the bicycle, the first wheel of which is retained in the receiving and holding device.

The blocking means give the possibility of limiting the oscillations of the bicycle in the case of parasitic movements of the seat (notably during the movements of rotation of the seat around the longitudinal direction), and also give the possibility of properly positioning the bicycles relatively to each other when there are several of them, notably in order to avoid their banging against each other.

Advantageously, the bicycle transport device may include separation means for moving away from the rear of the seat the second wheel of the bicycle, the first wheel of which is retained in the receiving and holding device.

The separation means give the possibility of moving the bicycle sufficiently rearwards relatively to the rear of the seat, so as not to interfere with the operation of the guard of the seat, and in order to guarantee perfect safety of the users.

Preferably, as lateral blocking means and/or separation means, it may be provided that the bicycle transport device include a bearing rod elongated along a second direction substantially parallel to the first direction, shaped and positioned so that, when the first wheel of the bicycle is held in the receiving and holding device, the second non-held wheel in the receiving and holding device will bear against the supporting rod.

Preferably, the receiving and holding device may include:
two side rails extending perpendicularly to the first direction away from the supporting devices towards free distal ends, positioned away from each other along the first direction according to a distance greater than the width of a bicycle wheel,
a first connecting segment connecting the distal ends of the side rails.

Such a receiving and holding device is simple and easy to make. This receiving and holding device thus defines a substantially U-shaped loop, both side rails forming the side branches, and the first connecting segment forming the bottom of the U.

Advantageously, the receiving and holding device may include a second connecting segment connecting the side rails, positioned away from the first connecting segment according to a distance of less than the diameter of a bicycle wheel.

The first bicycle wheel will thus be accommodated from top to bottom in the receiving and holding device by being radially supported on the first and second connecting segments. In this way any contact of the frame of the bicycle with the receiving and holding device is thereby avoided, while ensuring reliable holding of the wheel in the receiving and holding device.

Preferably, the first connecting segment may include, along the elongation direction of the side rails, a longitudinal V-shaped profile with an apex directed upwards. The first connecting segment is thus provided with a first rolling slope giving the possibility of facilitating the engagement of the wheel into the receiving and holding device, and with a second rolling slope giving the possibility of facilitating the withdrawal of the first wheel out of the receiving and holding device.

Advantageously, the receiving and holding device may include flared mouth means in the vicinity of the first connecting segment. The guiding of the first bicycle wheel is thereby facilitated so as to install it in the receiving and holding device until the latter is found positioned between both side rails.

BRIEF DESCRIPTION OF THE DRAWINGS

Other objects, features and advantages of the present invention will become apparent from the following description of particular embodiments, made with reference to the appended figures, wherein.

DETAILED DESCRIPTION

Figure 1:
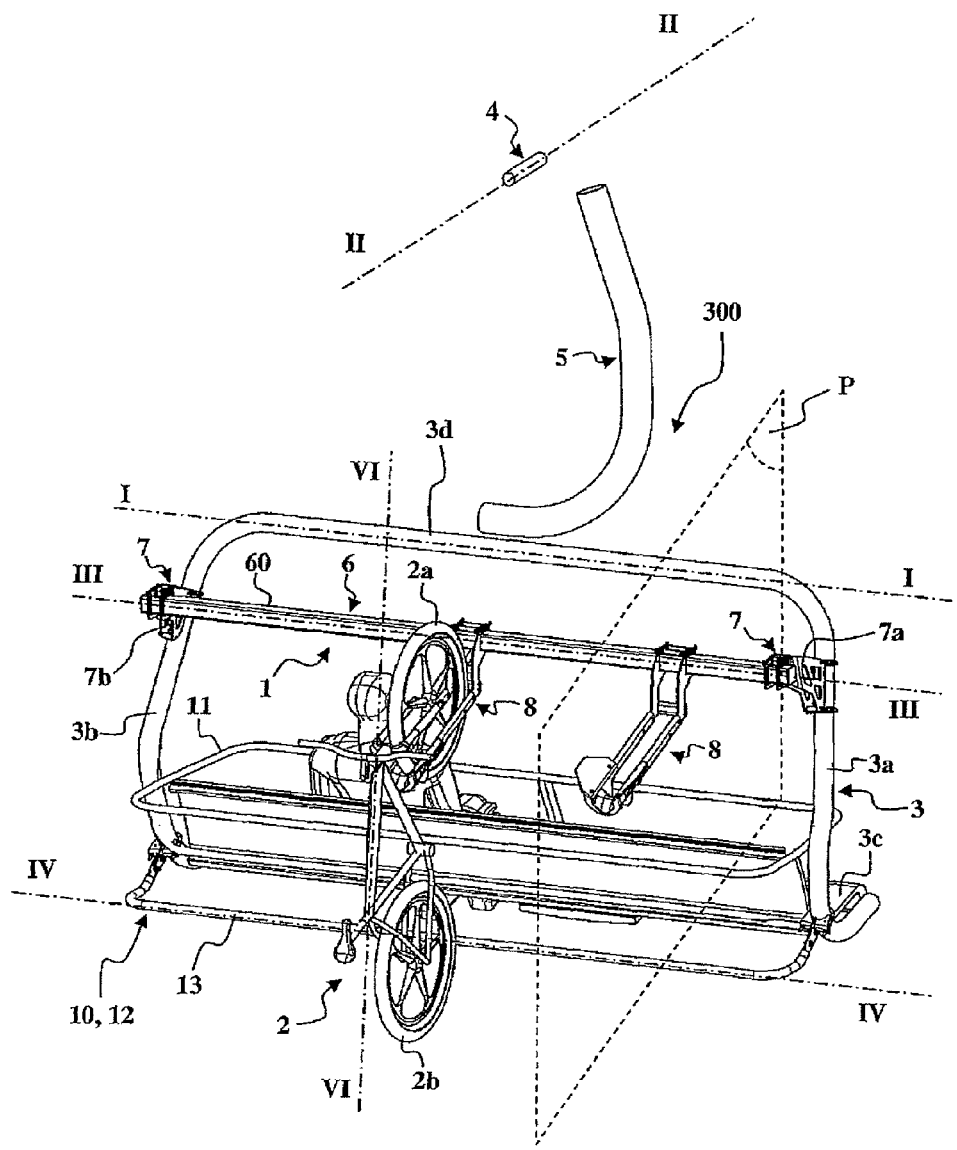
FIG. 1 is a perspective view of the rear of a chairlift seat with a bicycle transport device according to a first embodiment of the invention.
Figure 5:
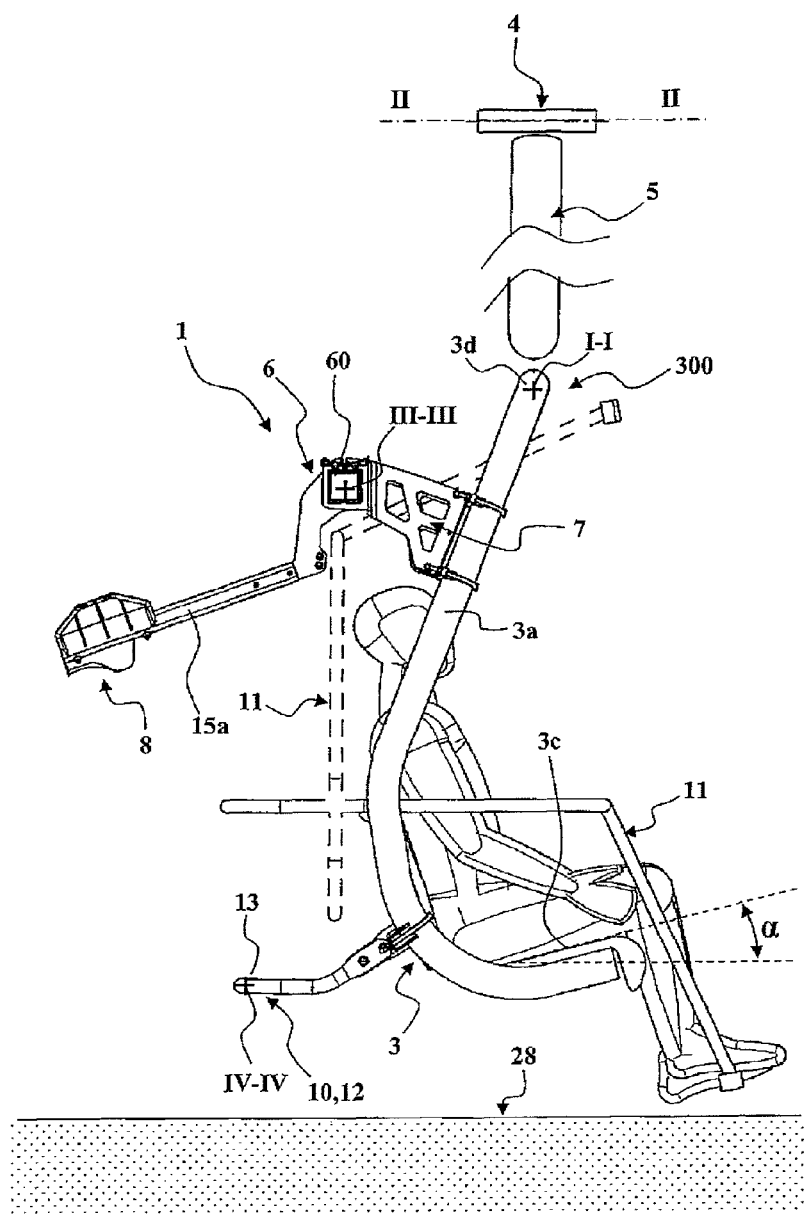
FIG. 5 is a side view of the chairlift seat of FIG. 1 without any bicycle.
Figure 8:
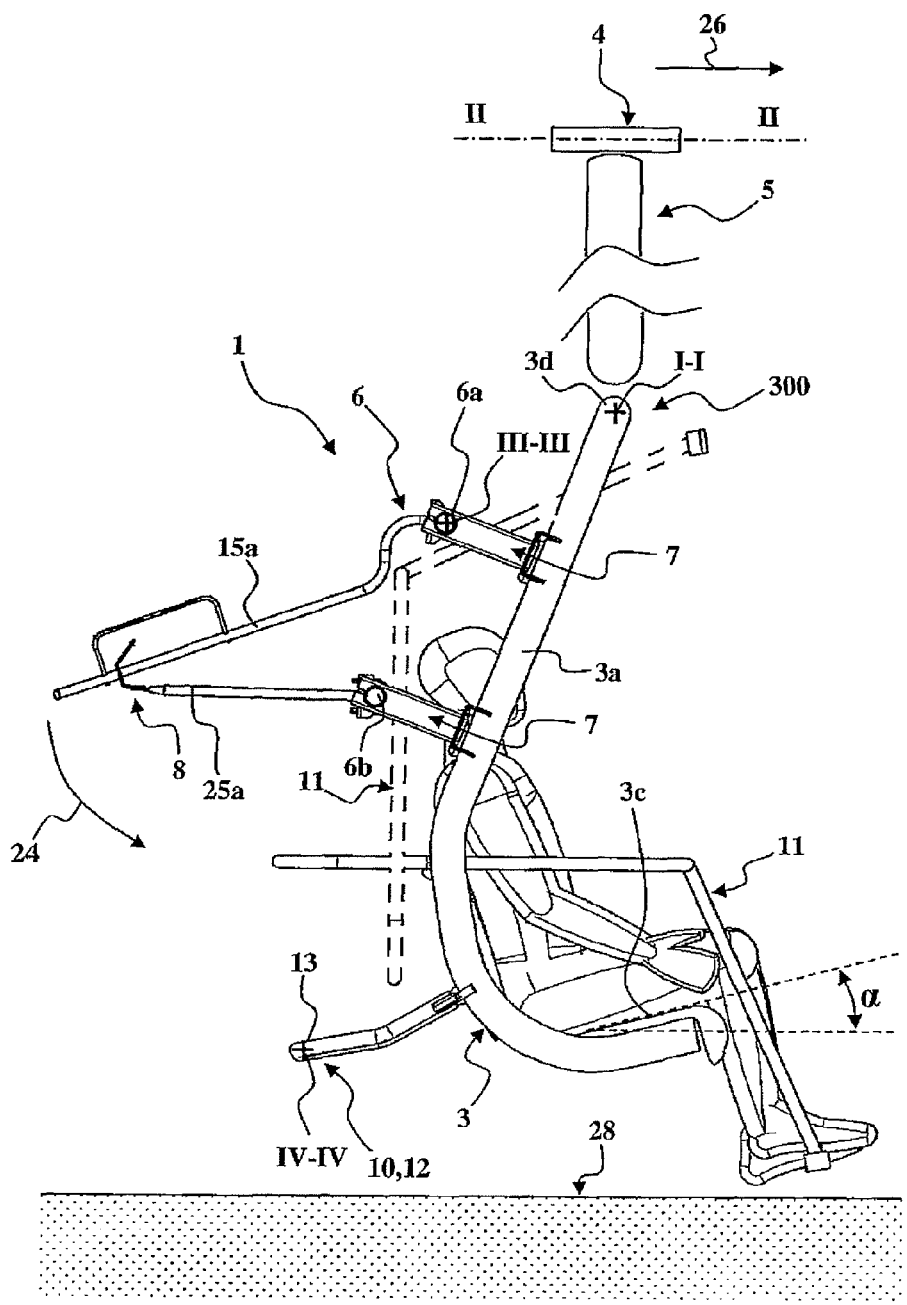
FIG. 8 is a side view of a seat with a bicycle transport device according to the second embodiment of the invention.

In FIGS. 1, 5 and 8, two particular embodiments of a chairlift seat 3 are illustrated with a bicycle transport device 1. In both embodiments, the transport device 1 is secured to a bearing structure 300 of a chairlift seat 3 extending in width along a transverse direction I-I. The bearing structure 300 in this case comprises suspension means 5 (partly illustrated) and two end lateral uprights 3a and 3b extending from a cross-bar 3d. The seat 3 is moved along a longitudinal direction II-II by a cable 4 from which it is hung by suspension means 5.

The transport device 1 comprises elongated supporting means 6 along a first direction III-III and securing means 7 shaped so as to attach the supporting means 6 behind the seat 3 with the first direction III-III substantially parallel to the transverse direction I-I of the seat 3.

In FIG. 1, it is seen that the transport devices 1 may include more than one receiving and holding device 8 (two here) borne by the supporting means 6. The receiving and holding devices 8 are shaped so as to respectively receive and hold at least one first wheel 2a of a bicycle 2, said first wheel 2a being oriented in a plane P substantially perpendicular to the first direction III-III.

In FIG. 1, in order to facilitate understanding by the user, a single one of the receiving and holding devices 8 receives a bicycle 2, but both receiving and holding devices 8 may each receive and hold a bicycle 2. It is also specified that the supporting means 6 may bear more than two receiving and holding devices 8, positioned away from each other so as to each give the possibility of engaging and withdrawing a bicycle 2 without any risk of conflict or interference.

In the seat 3 according to the invention, the transport device 1 is positioned at the rear of the seat 3, and does by no means interfere with the access of a user to the seating position 3c of the seat 3 and with the leaving of the latter from the seat 3.

More particularly in FIG. 1, it is seen that the transport device 1 includes securing means 7 which are positioned at the ends of the supporting means 6. The securing means 7 are shaped so as to be attached to the end lateral uprights 3a and 3b of the bearing structure 300 of the chairlift seat 3.

Such securing means 7 ensure compatibility of the transport device 1 with the quasi totality of the chairlift seats 3 present on the market, the latter quasi always comprising at least two end lateral uprights similar to the end lateral uprights 3a and 3b of the bearing structure 300 of the seat 3 and always accessible.

Figure 6:
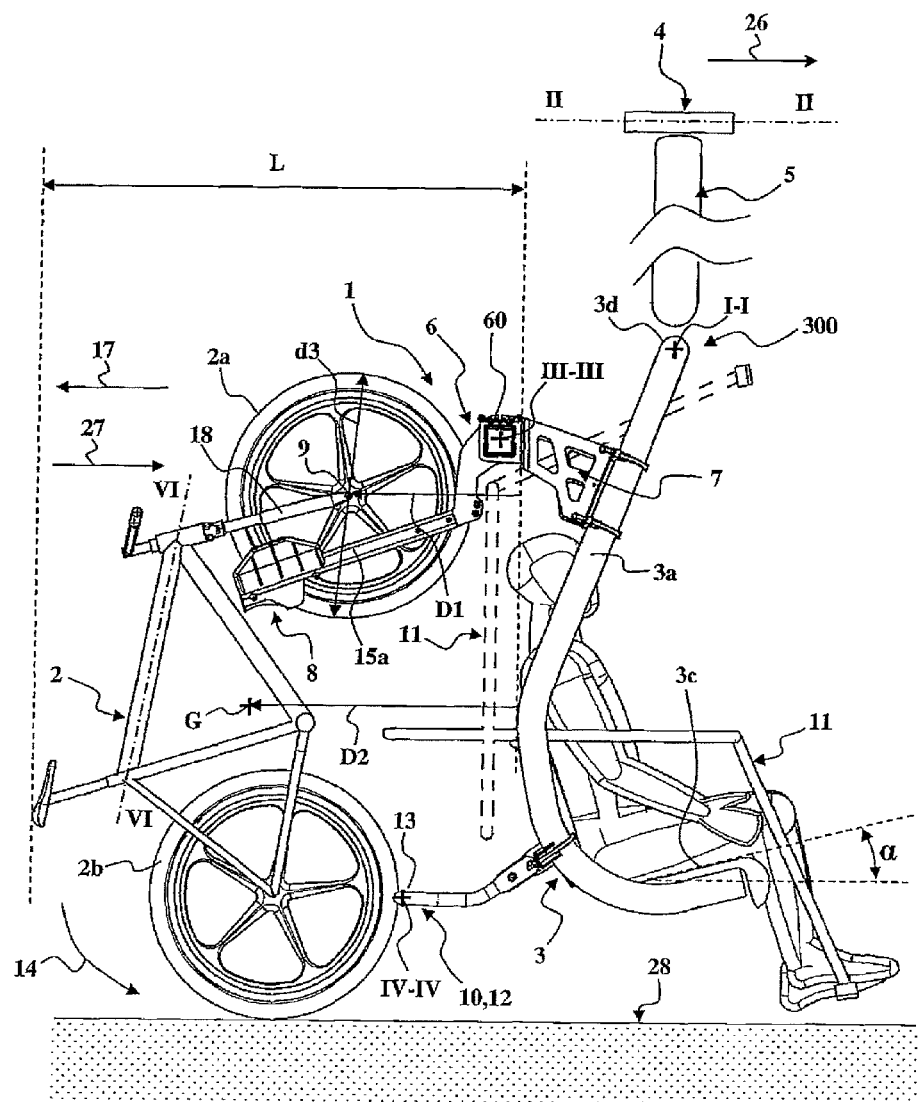
FIG. 6 is a side view of the chairlift seat of FIG. 1 provided with a bicycle.

In the embodiment illustrated in FIG. 1, the securing means 7 include in this case two securing parts 7a and 7b with the general shape of an L (FIGS. 5 and 6).

Alternatively, supporting means 6 may be attached to the suspension means 5 or to the cross-bar 3d.

In the case of a seat 3 with a bearing structure 300 only including a single lateral or intermediate upright, supporting means 6 may be attached to the single lateral or intermediate uprights, to the suspension means 5 or the cross-bar 3d.

Figure 9:
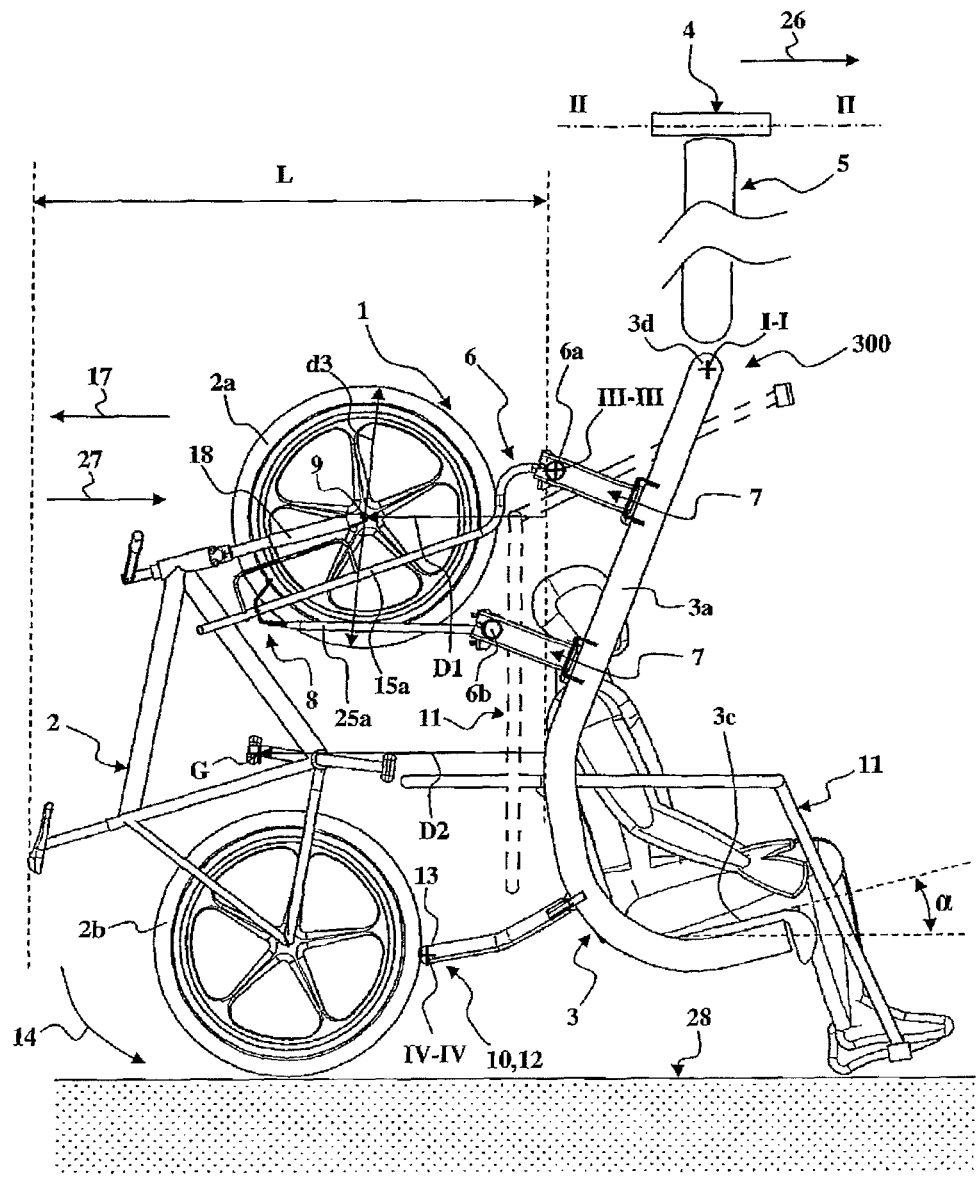
FIG. 9 is a side view of the seat of FIG. 8, provided with a bicycle.

It is seen in FIGS. 1, 6 and 9 that each receiving and holding device 8 is shaped so as to only receive and hold a single first wheel 2a of a bicycle 2. In this case, the first wheel 2a of the bicycle 2 is the front wheel of the bicycle 2. When the first bicycle wheel 2a is engaged and held in the receiving and holding device 8, the remainder of the bicycle 2 pivots around the hub 9 of the first wheel 2a so as to be oriented along a substantially vertical direction VI-VI, which allows limitation of the length L (FIG. 6) with which the bicycle 2 extends behind the seat 3 and away from the latter. The unbalance of the seat 3 induced by the presence of the bicycle 2 is thereby limited so that the seating position 3c retains relatively to the horizontal, an angle α compatible with the safety standards in effect for the transportation of persons by a chairlift.

In order to limit the oscillations of the bicycle 2, notably in the case of lateral movement of the seat (rotation of the seat 3 around the longitudinal direction II-II), lateral blocking means 10 are provided along the first direction III-III, in order to block the second wheel 2b of the bicycle 2, the first wheel 2a of which is held in the receiving and holding device 8.

In the case when it is desired to transport users on the seat 3 provided with a transport device 1, it is important that the transport device 1 should not prevent proper operation of the guard 11 of the seat 3. In FIGS. 6 and 9, the guard 11 is illustrated in a lowered position (in solid lines), as well as in a raised position (in dashed lines). In order to avoid any conflict between the bicycle 2 and the guard 11, notably in the case of a movement of the seat 3 in rotation around the transverse direction I-I and/or around the longitudinal direction II-II, separation means 12 may be provided for moving away from the rear of the seat 3, the second wheel 2b of the bicycle 2, the first wheel 2a of which is retained in the receiving and holding device 8.

In the embodiment illustrated in FIGS. 6 and 9, the lateral blocking means 10 and the separation means 12 coincide and are formed by a supporting rod 13, elongated along a second direction IV-IV substantially parallel to the first direction III-III, shaped and positioned so that, when the first wheel 2a of the bicycle 2 is held in the receiving and holding device 8, the second wheel 2b not held in the receiving and holding device 8 will bear against the supporting rod 13.

Thus, even if the bicycle 2 would start to oscillate around the hub 9 of the first wheel 2a, the latter would not be able to approach the seat 3 beyond the position which is illustrated in FIGS. 6 and 9, which allows the guard 11 to be raised and lowered without any interference.

For good efficiency of the lateral blocking means 10 of the second wheel 2b, the supporting rod 13 is positioned so that the second wheel 2b will permanently radially bear against the supporting rod 13. To do this, the supporting rod 13 is positioned so that the center of gravity G of the bicycle 2 is located at a distance D2 from the seat 3 greater than the distance D1 separating the seat 3 and the hub 9 of the first wheel 2a along the longitudinal direction II-II. In this position, the bicycle 2 tends to permanently turn around the hub 9 according to the movement of rotation illustrated by the arrow 14. The result of this is that the second wheel 2b will permanently bear against the supporting rod 13, which limits its lateral displacement along the first direction at least in the case of rotation of the seat 3 around the longitudinal direction II-II.

Figure 2:
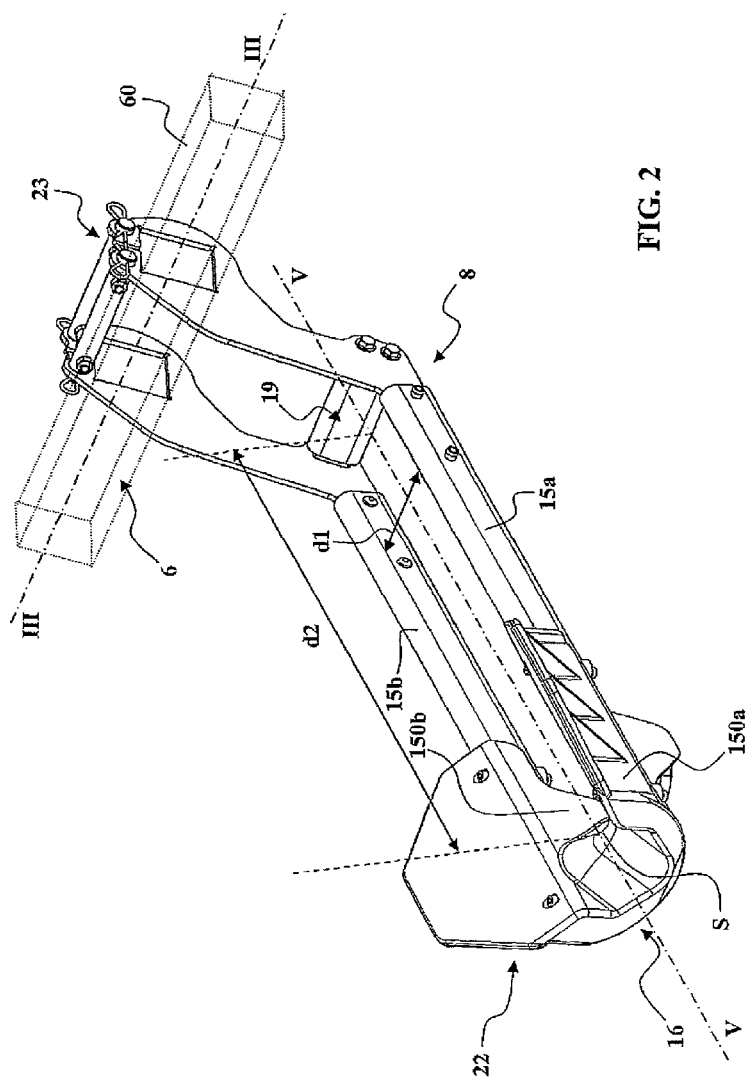
FIG. 2 is a perspective view of a receiving and holding device used in the bicycle transport device of FIG. 1.
Figure 7:
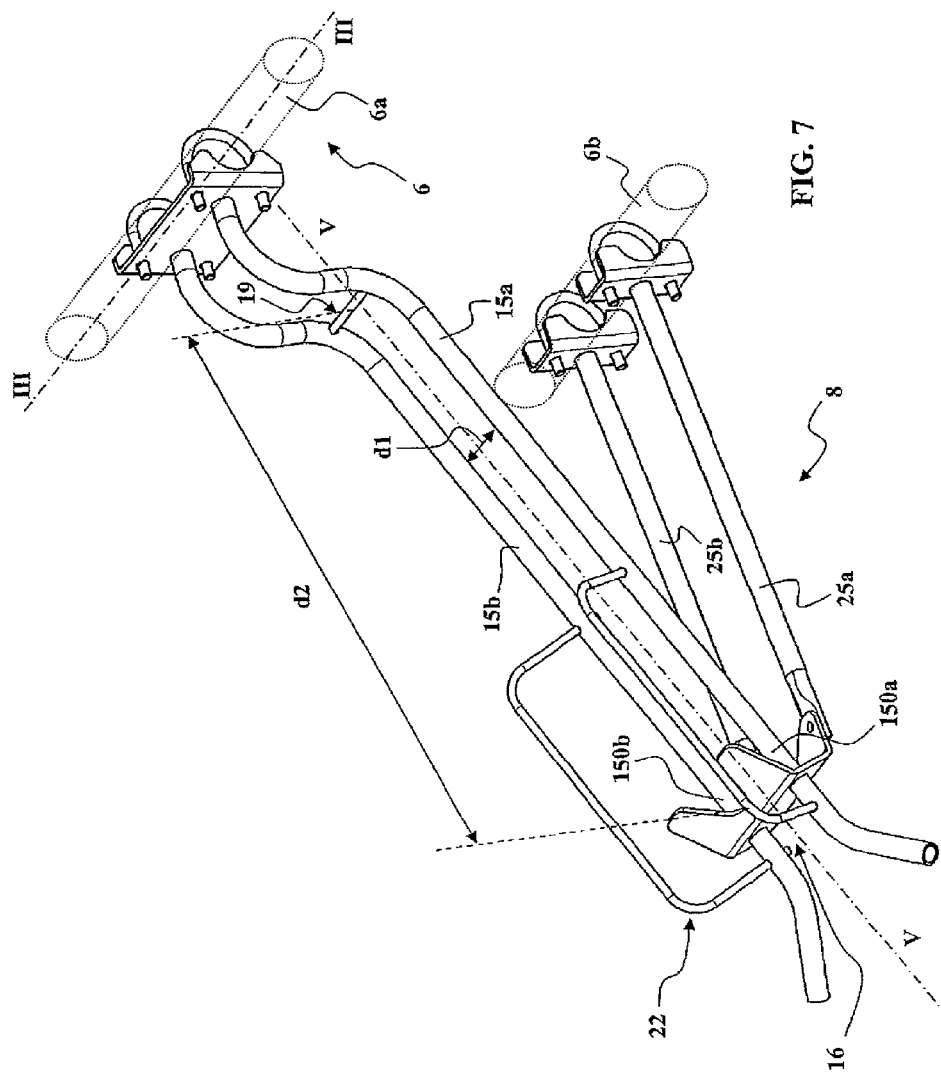
FIG. 7 is a perspective view of a receiving and holding device for a chairlift seat according to a second embodiment of the invention.

In FIGS. 2 and 7 are illustrated two alternatives of the receiving and holding device 8 respectively used in the first and second embodiments of a seat 3 with a transport device 1 according to the invention.

These receiving and holding devices 8 include:
two side rails 15a and 15b, extending perpendicular to the first direction III-III away from the supporting means 6 towards free distal ends 150a and 150b, positioned away from each other along the first direction III-III along a distance d1 greater than the width of a bicycle wheel 2.
a first connecting segment 16 connecting the distal ends 150a and 150b of the side rails 15a and 15b.

The side rails 15a and 15b, extending along a direction V-V, will maintain the first wheel 2a oriented in the plane P (FIG. 1) substantially perpendicular to the first direction III-III, while the first connecting segment 16 prevents the first wheel 2a from coming out of the receiving and holding device 8 by a withdrawal movement illustrated by the arrow 17 (FIGS. 6 and 9).

In practice, both side rails 15a and 15b are moved away by a distance d1 greater than the width of a mountain bike tire, the distance d1 may advantageously be comprised between about 70 mm and about 100 mm.

In order to avoid that the fork 18 of the bicycle 2 will directly bear against the side rails 15a and 15b and be thus deteriorated, but also for blocking the first wheel 2a along the elongation direction V-V, the receiving and holding devices 8 of FIGS. 2 and 7 include a second connecting segment 19 connecting the side rails 15a and 15b. The second connecting segment 19 is positioned away from the first connecting segment 16 and away from the distal ends 150a and 150b of the side rails 15a and 15b, at a distance d2 from the first connecting segment 16, d2 being less than the diameter d3 of a bicycle wheel 2. In practice, a distance d2 of about 640 mm may be selected.

Figure 3:
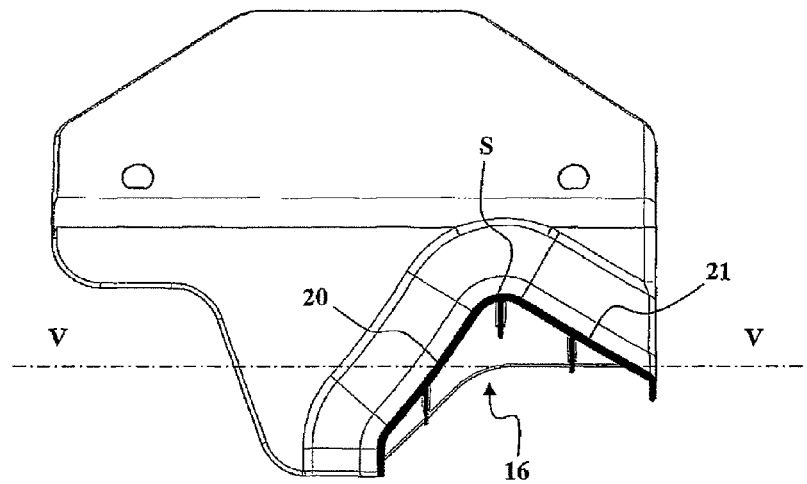
FIG. 3 is a sectional view of an element of the receiving and holding device of FIG. 2.
Figure 4:
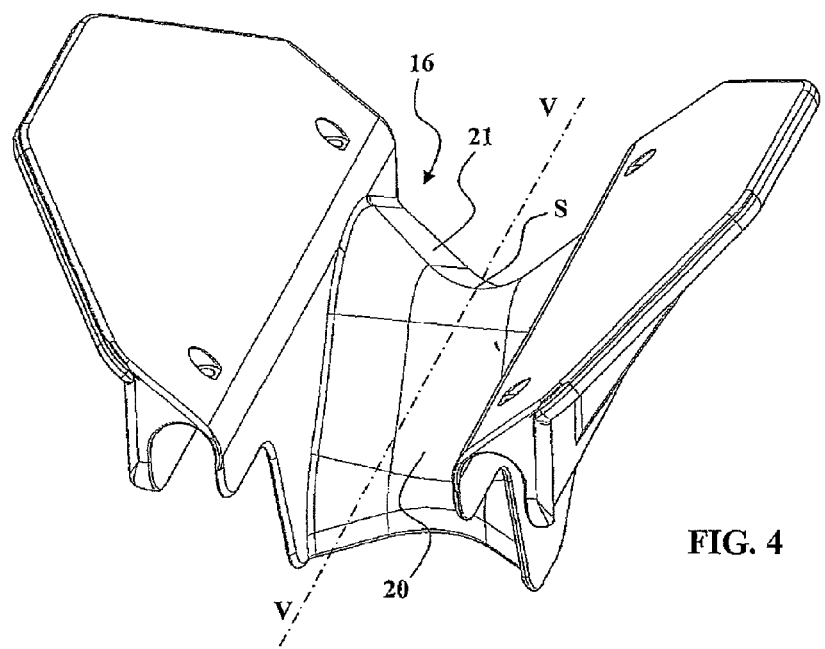
FIG. 4 is a perspective view of the element of FIG. 3.

As this is more particularly seen in FIGS. 3 and 4, the receiving and holding device 8 of FIG. 2 has a first connecting segment 16 which includes, along the extension direction V-V of the side rails 15a and 15b, a V-shaped longitudinal profile with an apex S directed upwards.

The first connecting segment 16 is thus provided with a first slope 20 and a second slope 21. The first slope 20 allows gradual engagement of the first wheel 2a in the receiving and holding device 8, while the second slope 21 allows gradual withdrawal of the first wheel 2a out of the receiving and holding device 8.

In FIGS. 2 and 7, it is seen that the receiving and holding devices 8 each include flared mouth means 22 in the vicinity of the first connecting segments 16 and this in order to facilitate guiding of the first wheel 2a in order to bring it between both side rails 15a and 15b.

In the first embodiment of the transport device 1 according to the invention, more particularly illustrated in FIGS. 1 to 5, it is noted on FIGS. 1, 2, and 6 that the supporting means 6 only include a single rod 60 with a non-circular cross-section. On its side, as more particularly visible in FIG. 2, the receiving and holding device 8 includes attachment means 23 capable of cooperating by shape-mating with the cross-section of the single rod 60 so as to be added, blocked in rotation and removably attached on the single rod 60.

The mating of the shapes between the attachment means 23 and the rod 60 gives the possibility of taking up the pivoting torque induced in the receiving and holding device 8 by the presence of the bicycle 2.

The supporting means 6 thus include a minimum of constitutive elements and may be very rapidly and very easily installed with a minimum of manpower on the seat 3.

Conversely, as this may be seen more particularly in FIGS. 8 and 9 relating to the second embodiment of the seat 3 with a transport device 1 according to the invention, the supporting means 6 include an upper rod 6a with a circular cross-section which cannot maintain the receiving and holding device 8 in an orientation relatively to the seat 3 when the bicycle 2 is engaged into the receiving and holding device 8 and imparts to it a rotation torque around the first direction III-III (illustrated by the arrow 24 in FIG. 8).

It is then necessary to provide a lower rod 6b connected to the distal ends 150a and 150b of the side rails 15a and 15b via spacers 25a and 25b (FIG. 7). The supporting means 6 thus include a larger number of constitutive elements, the mounting of which on the seat 3 requires more time, and which has more risks of being in conflict with one of the constitutive elements of the seat 3, which risks being detrimental to the compatibility of the transport device 1 with the multiple chairlift seat 3 present on the market.

The use of a seat 3 with a transport device 1 according to the invention will now be illustrated by means of FIG. 6, it being observed that the use of the transport device illustrated in FIGS. 8 and 9 is identical.

When the seat 3 passes into the loading station, the latter is driven according to a longitudinal advance movement illustrated by the arrow 26. The person responsible for the operations for loading bicycle 2 then moves closer to the rear of the seat 3 according to a movement illustrated by the arrow 27, by wheeling the bicycle 2 with both of its wheels on the ground 28.

Having reached the close proximity of the transport device 1, the person responsible for the loading pulls up the bicycle 2 by lifting the front wheel 2a and brings the bicycle 2 into a substantially vertical orientation as illustrated in FIG. 6.

During this orientational movement, the person responsible for the loading only lifts a portion of the total weight of the bicycle 2.

The person responsible for the loading then performs a final approach to the transport device 1 by wheeling the bicycle 2 on the ground 28 only by means of its second wheel 2b (rear wheel) and this until the first wheel 2a (front wheel) is brought against the first slope 20 of the first connecting segment 16.

The person responsible for the loading then performs pushing of the bicycle 2 along the longitudinal direction II-II in the direction of the arrow 27 so as to have the wheel 2a move up the first slope 20 until it reaches the top S (FIG. 3), and then accompanies the bicycle 2 with its first wheel 2a rolling over the second slope 21 (FIG. 3) until the first wheel 2a will rest on the second connecting segment 19. During these movements forcing the penetration of the first wheel 2a into the receiving and holding device 8, the second wheel 2b may continue its rolling movement on the ground 28 or be slightly lifted up, according to the height separating the receiving and holding device 8 from the ground 28.

The person responsible for the loading may then release the bicycle 2 which is reliably held on the seat 3 with its first wheel 2a engaged between both side rails 15a and 15b and supported on the connecting segments 16 and 19.

During the loading operations carried out by the person responsible for the loading, the user (cyclist) may access without any incident the front of the seat 3 in order to be able to sit on the seating position 3c. Once seated, the user may proceed with lowering the guard 11 before departure of the seat 3 from the loading station.

It should be noted that in the case of a disengageable chairlift, the advance movement of the seat 3 illustrated by the arrow 26 is accomplished at a speed which may be sufficiently slow so that the user himself/herself proceeds with loading of his/her bicycle 2, and then, once the loading is accomplished, moves safely around the seat 3 through one of its sides in order to sit down on the seating position 3c.

Alternatively, in the case when it is the actual user who proceeds with the loading of his/her bicycle 2, the latter may also sit on the following seat, it being observed that the user after loading is ideally placed for his/her boarding onto the next seat.

In the unloading station, the withdrawal of the bicycle 2 is carried out by a person responsible for unloading or by the actual user.

During unloading, it is sufficient to hold the bicycle 2 along the longitudinal direction II-II while the seat 3 continues its advancing movement along the longitudinal direction II-II. The first wheel 2a will then roll on the second slope 21 up to the top S and then move down along the first slope 20 and will be released from the receiving and holding device 8. During this withdrawal operation, the second wheel 2b of the bicycle 2 may roll on the ground 28 or be slightly above the latter, depending on the height separating the receiving and holding device 8 from the ground 28.

The bicycle 2 may then be laid on the ground on both of its wheels 2a and 2b.

In the unloading station, the user (cyclist) sitting down beforehand on the seat 3 may easily exit the latter without risking any interference by the transport device 1 according to the invention.

The present invention is not limited to the embodiments which have been explicitly described, but it includes various alternatives and generalizations thereof contained in the field of the claims hereafter.

The invention claimed is:

1. A chairlift seat extending in width along a transverse direction and intended to be displaced along a longitudinal direction, including a bicycle transport device comprising:
   supporting means elongated along a first direction substantially parallel to the transverse direction of the seat,
   at least one receiving and holding device, borne by the supporting means, shaped in order to receive and hold at least one first bicycle wheel orientated in a plane substantially perpendicular to the first direction,
   wherein the transport device is positioned behind the seat;
   wherein the seat includes a bearing structure with lateral uprights,
   wherein securing means are positioned at the ends of the supporting means, and
   wherein the securing means are shaped so as to be attached to the lateral uprights of the bearing structure;
   wherein the receiving and holding device includes:
      two side rails extending perpendicularly to the first direction away from the supporting means towards free distal ends positioned away from each other along the first direction according to a distance greater than the width of a bicycle wheel,
      a first connecting segment connecting the distal ends of the side rails; and
   wherein the receiving and holding device includes a second connecting segment, connecting the side rails, positioned away from the first connecting segment according to a distance smaller than the diameter of a bicycle wheel.

2. The chairlift seat according to claim 1, wherein the supporting means include a single rod.

3. The chairlift seat according to claim 2, wherein:
   the single rod has a non-circular cross section, and
   said at least one receiving and holding device is added and removably attached onto the single rod via attachment means cooperating by shape mating with the cross section of the rod.

4. The chairlift seat according to claim 1, wherein each receiving and holding device is shaped so as to only receive and only hold a single first bicycle wheel.

5. The chairlift seat according to claim 4, wherein the transport device includes lateral blocking means for blocking along the first direction the second wheel of the bicycle, the first wheel of which is retained in the receiving and holding device.

6. The chairlift seat according to claim 4, wherein the transport device includes separation means for moving away from the rear of the seat the second wheel of the bicycle, the first wheel of which is held in the receiving and holding device.

7. The chairlift seat according to claim 4, wherein the transport device includes a supporting rod elongated along a second direction substantially parallel to the first direction, shaped and positioned so that when the first wheel of the bicycle is held in the receiving and holding device, the second wheel not held in the receiving and holding device will bear against the supporting rod.

8. The chairlift seat according to claim 1, wherein the first connecting segment includes, along the direction for extending the side rails, a V-shaped longitudinal profile with an apex directed upwards.

9. The chairlift seat according to claim 1, wherein the receiving and holding device includes a flared mouth disposed outward of the first connecting segment wherein the flared mouth is configured to guide the first bicycle wheel into a position between the two side rails and between the first and second connecting segments.

10. The chairlift seat according to claim 8, wherein the first connecting segment further includes a concave cross-sectional profile parallel to the first direction.

11. The chairlift according to claim 1, further comprising a supporting rod connected to the lateral uprights of the bearing structure of the seat, wherein the supporting rod extends between the lateral uprights parallel to the first direction and is disposed to bear against a second bicycle wheel positioned beneath the first bicycle wheel.

12. The chairlift according to claim 11, wherein the supporting rod is disposed such that a center of gravity of the bicycle is located at a distance D2 from the seat, wherein a center of the first bicycle wheel is located at a distance D1 from the seat, and wherein D2 is greater than D1.

* * * * *